(No Model.)

R. M. SEARS.
HORSE COLLAR.

No. 346,226. Patented July 27, 1886.

WITNESSES:
J. D. Garfield
C. Sedgwick

INVENTOR:
R. M. Sears
BY Munn & Co.
ATTORNEYS.

UNITED STATES PATENT OFFICE.

ROBERT M. SEARS, OF SAN FRANCISCO, CALIFORNIA.

HORSE-COLLAR.

SPECIFICATION forming part of Letters Patent No. 346,226, dated July 27, 1886.

Application filed March 4, 1886. Serial No. 193,970. (No model.)

*To all whom it may concern:*

Be it known that I, ROBERT M. SEARS, of San Francisco, in the county of San Francisco and State of California, have invented a new and useful Improvement in Horse-Collars, of which the following is a specification, reference being had to the annexed drawings, forming a part thereof, in which—

Figure 1:
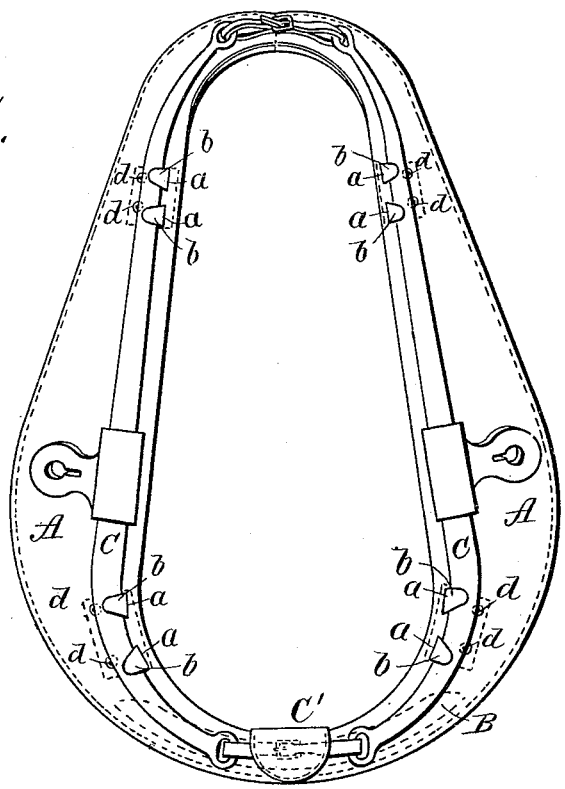
Figure 2:
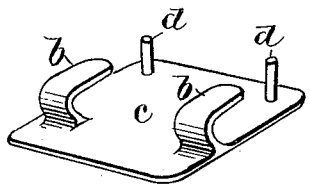
Figure 3:
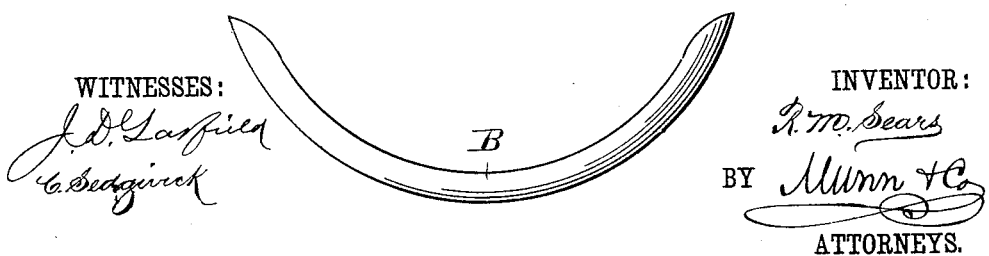

Figure 1 is a front elevation of my improved horse-collar. Fig. 2 is a perspective view of one of the hame-holding plates. Fig. 3 is a side elevation of the wooden bow received in the lower part of the collar.

Similar letters of reference indicate corresponding parts in the different figures of the drawings.

The object of my invention is to provide a horse-collar which will be soft and flexible, and which will readily adapt itself to the form of a horse's neck and shoulders, and which at the same time will firmly hold the hames, so that they will not be removed from their bearings on the collar by a sudden movement of the horse or lurching of the wagon.

My invention consists in a soft flexible collar stiffened in the throat portion by a rigid curved bar, and provided with clips or hooks for receiving and holding the hames.

The pads A of the horse-collar are of the usual form; but the rolls which are commonly employed to hold the hames are omitted. The throat portion of the collar is provided with a curved rigid bar inclosed in the covering of the collar, and serving to strengthen and stiffen the collar at that point, also to prevent the horse from being choked by undue pressure from the narrower part of the collar. In the outer or front side of the collar are formed slits $a$, through which are projected the hooks $b$, which are formed integrally with the base-plate $c$, as shown in Fig. 2. The base-plate $c$ projects on opposite sides of the hooks $b$, to form extended bearings against the inner surface of the covering of the collar, and the plate is provided with two or more studs, $d$, which pass through holes in the covering in the collar, and are riveted down upon burrs or washers to hold the plate in place in the collar. The plate $c$, with its hooks $b$ and studs $d$, may be formed of malleable iron or any other suitable material, and the hooks $b$ are arranged to retain the upper and lower ends of the hames C, as shown in Fig. 1. The hooks form a positive attachment for the hames, and prevent them from being disengaged from the collar by any motion of the tongue or thills of the wagon or by a sudden jerk of the horse.

To protect the hame-strap from wear and injury, I provide an apron, C', which is attached to the inner edge of the collar and hangs down over the hame-strap.

It is obvious that instead of employing studs $d$, cast integrally with the plate $c$, I may aperture the plate and fasten it in place with rivets.

Having thus described my invention, what I claim as new, and desire to secure by Letters Patent, is—

1. The combination, with the pads A of a horse-collar, of the curved wooden bar B, inclosed in the throat portion of the collar, substantially as herein shown and described.

2. As an improved article of manufacture, a hame-holder for horse-collars, formed of a base-plate, $c$, one or more hooks, $b$, and one or more studs, $d$, made integrally with the base-plate, substantially as herein shown and described.

3. The combination, with the pads A of a horse-collar, of the curved rigid bar B and the hame-holding hooks $b$, formed integrally with the base-plate $c$, and means for fastening the base-plate within the covering of the pads, substantially as herein shown and described.

ROBERT M. SEARS.

Witnesses:
T. MAHONY,
ROBERT MCELROY.